(12) United States Patent
Roussel et al.

(10) Patent No.: US 8,541,542 B2
(45) Date of Patent: Sep. 24, 2013

(54) PROCESS FOR REDUCING RESIDUALS CONTENT IN VINYL AROMATIC POLYMERS

(75) Inventors: Thomas-Maurice Roussel, Lyons (FR); Bruno Vuillemin, Lescar (FR); Francois Fajula, Teyran (FR)

(73) Assignee: Total Research & Technology Feluy, Seneffe (Feluy) (BE)

( * ) Notice: Subject to any disclaimer, the term of this patent is extended or adjusted under 35 U.S.C. 154(b) by 332 days.

(21) Appl. No.: 12/374,807

(22) PCT Filed: Jul. 13, 2007

(86) PCT No.: PCT/EP2007/057259
§ 371 (c)(1),
(2), (4) Date: Jan. 19, 2010

(87) PCT Pub. No.: WO2008/012217
PCT Pub. Date: Jan. 31, 2008

(65) Prior Publication Data
US 2010/0113707 A1    May 6, 2010

(30) Foreign Application Priority Data
Jul. 26, 2006   (EP) .................................. 06291223

(51) Int. Cl.
C07C 7/00      (2006.01)
C07C 7/148     (2006.01)
C07C 7/177     (2006.01)
C08J 11/02     (2006.01)
C08J 11/16     (2006.01)

(52) U.S. Cl.
USPC ........ 528/485; 525/342; 525/333.3; 525/370; 525/371; 525/372; 203/30; 526/71; 526/346; 528/482; 528/490; 428/482; 428/485

(58) Field of Classification Search
USPC ........ 525/342, 333.3, 370, 371, 372; 526/71, 526/346; 428/482, 485; 203/30; 528/482, 528/485, 490
See application file for complete search history.

(56) References Cited

U.S. PATENT DOCUMENTS

| | | | |
|---|---|---|---|
| 4,777,210 A * | 10/1988 | Sosa et al. ........................ | 525/53 |
| 5,225,471 A * | 7/1993 | Tajima et al. .................. | 524/284 |
| 5,961,943 A * | 10/1999 | Komatsu et al. ........... | 423/328.2 |
| 6,310,154 B1 | 10/2001 | Babcock et al. | |
| 6,395,947 B1 | 5/2002 | Kwak et al. | |
| 6,673,892 B2 * | 1/2004 | Martinez et al. .............. | 528/480 |
| 2002/0032266 A1 | 3/2002 | Sextl et al. | |
| 2002/0061812 A1* | 5/2002 | Yamazaki et al. .............. | 502/60 |

FOREIGN PATENT DOCUMENTS

| | | | |
|---|---|---|---|
| EP | 1072641 | * | 1/2001 |
| JP | 08-053164 A | | 2/1996 |
| JP | 2001 329128 | | 11/2001 |
| JP | 2001-329128 | * | 11/2001 |
| JP | 2002-227386 A | | 8/2002 |
| JP | 2006-182840 A | | 7/2006 |
| WO | WO 99/36377 | | 7/1999 |

OTHER PUBLICATIONS

Ramos, Catalysis Letters, 51 (1998) 117-119.*

* cited by examiner

*Primary Examiner* — Robert C Boyle

(57) ABSTRACT

The present invention relates to a process for reducing residuals content in a vinyl aromatic polymer, said residuals comprising essentially unpolymerized vinyl aromatic monomer, wherein the vinyl aromatic polymer in the molten state is brought in contact with a solid in powder capable to catalyze the alkylation of said residual vinyl aromatic monomer on the vinyl aromatic polymer. Advantage of the present invention is a sharp reduction of the unpolymerized vinyl aromatic monomer in the vinyl aromatic polymer without generating a new residual and without inducing a colored vinyl aromatic polymer. The present invention also relates to said vinyl aromatic polymer having a low residuals content.

11 Claims, No Drawings

PROCESS FOR REDUCING RESIDUALS CONTENT IN VINYL AROMATIC POLYMERS

CROSS-REFERENCE TO RELATED APPLICATIONS

This application claims the benefit of PCT/EP2007/057259, filed Jul. 13, 2007, which claims priority from EP 06291223.3, filed Jul. 26, 2006.

FIELD OF THE INVENTION

The present invention relates to a process for reducing residuals content in vinyl aromatic polymers and more particularly in polystyrene (PS). In the process of the present invention the vinyl aromatic polymer is brought in contact, in the molten state, with a solid in powder Capable to catalyze the alkylation of said residual vinyl aromatic monomer on the vinyl aromatic polymer.

THE PRIOR ART AND THE TECHNICAL PROBLEM

In the polystyrene (PS) manufacture, residual material including monomers, solvents or diluents such as ethylbenzene and low molecular weights oligomers such as dimers and trimers may be present in the polymer coming out of the polymerization reactor. Most of the PS produced globally is made using free-radical bulk polymerization processes. These processes polymerize styrene to only about 90% conversion. Unreacted styrene is removed by heating under a vacuum at high temperature. The level of residual styrene monomer left in the resin is typically 100-1000 ppm range and most frequently 200 to 500 ppm. The volatiles materials remaining in polymer compositions have become an issue from the standpoint of the hygiene and safety, and polymers that are reduced in volatile materials have become demanded as products.

To get lower level of residuals simple heating is not enough. Many techniques have been tried such as: falling strand devolatilization, centrifugal devolatilization, multistage devolatilization. Various stripping agents have also been tried such as: Steam or water, organic solvent such as acetone or methanol, supercritical CO2, ultrasonic bubble nucleation.

Most of these techniques reach a barrier in term of residual styrene content (around 100 ppm) due to the thermodynamics equilibrium between gas phase and molten polymer phase. It implies that to reach very low residual styrene content, the temperature and residence time inside the devolatilization devices have to be increased leading to a degradation of the polystyrene.

That's why chemical routes have been developed to get polystyrene with very low residual styrene content (<100 ppm and better <50 ppm and still better <10 ppm). These chemical routes consist in adding to the polymer a scavenger: a scavenger is a molecule added to PS at a low concentration and which reacts with the residual styrene to consume it or/and to form a "friendly" molecule. Nevertheless there is an inherent difficulty in the use of scavengers for this purpose, which is that small molecules in very low concentration must diffuse together and react in a viscous polymer matrix.

Japanese patent application JP2001329128 A published on 27 Nov. 2001 describes cup of instant noodle made of polystyrene foam sheet. Said polystyrene is blended with zeolites to reduce styrene dimer and styrene trimer content.

Japanese patent application JP2002227386 A published on 14 Aug. 2002 describes polystyrene foam to make building materials. Said polystyrene is blended with zeolite 13X to reduce styrene monomer content. This zeolite is a microporous one.

US 2002-0032266 relates to colorless plastics that release only very small amounts of undesirable organic compounds due to the addition of special additives. The above and other objects of said prior art can be achieved by using colorless and low-emission plastics which contain at least one zeolite of structure type ZSM-5, which has a maximum water absorption capacity of 10 wt % with respect to the weight of the zeolite, at 25° C. and 4.6 torr. The zeolites that are used have a molar Si/Al ratio of at least 15, preferably from 50 to 500. In addition, the selected zeolites have a pore size of at least 5.5 Angstrom in order to be able to absorb organic compounds and permanently bind them. All conventional plastics can be used as base materials, for example polyvinyl chloride, polyethylene terephthalate, polystyrene, acrylonitrile butadiene styrene (ABS), polyesters, polyamides, polyethylene, HDPE, polypropylene, especially oriented polypropylene (OPP).

The use of theses adsorbents in order to eliminate the residual styrene in polystyrene leads to either the generation of significant amount of secondary compounds (mainly ethylbenzene) or a non significant decrease of the residual styrene. Another drawback is the polystyrene getting colored around dark brown and orange. The present invention relates to the use of some porous solids having different characterisitcs than the solids generally quoted to eliminate the odors in thermoplastics and which enable to significantly decrease the amount of residual styrene in polystyrene while limiting ethyl-benzene generation as well as the polystyrene coloration.

BRIEF DESCRIPTION OF THE INVENTION

The present invention relates to a process for reducing residuals content in a vinyl aromatic polymer, said residuals comprising essentially unpolymerized vinyl aromatic monomer, wherein the vinyl aromatic polymer in the molten state is brought in contact with a solid in powder capable to catalyze the alkylation of said residual vinyl aromatic monomer on the vinyl aromatic polymer.

Advantage of the present invention is a sharp reduction of the unpolymerized vinyl aromatic monomer in the vinyl aromatic polymer without generating a new residual and without inducing a colored vinyl aromatic polymer.

The present invention also relates to said vinyl aromatic polymer having a low residuals content.

DETAILED DESCRIPTION OF THE INVENTION

As regards the vinyl aromatic polymer, mention may be made of:
  polystyrene, elastomer-modified polystyrene,
  copolymers of styrene and acrylonitrile (SAN), elastomer-modified SAN, in particular ABS, which is obtained, for example, by grafting (graft polymerization) of styrene and acrylonitrile on a backbone of polybutadiene or of butadiene-acrylonitrile copolymer,
  mixtures of SAN and ABS,
  copolymers with styrene blocks and blocks made of butadiene or isoprene or of a mixture butadiene/isoprene, these block copolymers can be linear blocks copolymers or star blocks copolymers, they can be hydrogenated and/or functionalized. These copolymers are described in ULLMANN'S ENCYCLOPEDIA OF INDUSTRIAL CHEMISTRY, fifth edition (1995) Vol A26, pages 655-659, They are sold by Total Petrochemicals under the trade mark Finaclear®, by BASF under the trade mark Styrolux®, under the trade mark K-Resin® by Chevron Phillips Chemical, SBR (Styrene butadiene rubber), Possible examples of the abovementioned elastomers are EPR (the abbreviation for ethylene-propylene rubber or ethylene-propylene elastomer), EPDM (the abbreviation for ethylene-propylene-diene rubber or ethylene-propylene-diene elastomer), polybutadiene, acrylonitrile-butadiene copolymer, polyisoprene, isoprene-acrylonitrile copolymer and copolymers with styrene blocks and blocks made of butadiene or isoprene or of a mixture butadiene/isoprene. These block copolymers can be linear blocks copolymers or star blocks copolymers, they can be hydrogenated and/or functionalized (see above).

In the above vinyl aromatic polymer just mentioned, part of the styrene may be replaced by unsaturated monomers copolymerizable with styrene, for example alpha-methylstyrene or (meth)acrylates, Other examples of styrene copolymers which may be mentioned are chloropolystyrene, poly-alpha-methylstyrene, styrene-chlorostyrene copolymers, styrene-propylene copolymers, styrenebutadiene copolymers, styrene-isoprene copolymers, styrene-vinyl chloride copolymers, styrene-vinyl acetate copolymers, styrene-alkyl acrylate copolymers (methyl, ethyl, butyl, octyl, phenyl acrylate), styrene-alkyl methacrylate copolymers (methyl, ethyl, butyl, phenyl methacrylate), styrene methyl chloroacrylate copolymers and styrene-acrylonitrile-alkyl acrylate copolymers.

In a specific embodiment the vinyl aromatic polymer comprises:
i) from 60 to 100 weight % of one or more $C_{8-12}$ vinyl aromatic monomers; and
ii) from 0 to 40 weight % of one or more monomers selected from the group consisting of $C_{1-4}$ alkyl esters of acrylic or methacrylic acid and acrylonitrile and methacrylonitrile;
which polymer may be grafted onto or occluded within from 0 to 20 weight % of one or more rubbery polymers.

By way of example rubbery polymers can be selected from the group consisting of:
a) co- and homopolymers of $C_{4-8}$ conjugated diolefins,
b) copolymers comprising from 60 to 85 weight % of one or more $C_{4-6}$ conjugated diolefins and from 15 to 40 weight % of a monomer selected from the group consisting of acrylonitrile and methacrylonitrile and
c) copolymers comprising from 20 to 60, preferably from 40 to 50 weight % of one or more $C_{8-12}$ vinyl aromatic monomers which are unsubstituted or substituted by a $C_{1-4}$ alkyl radical and from 60 to 40, preferably from 60 to 50 weight % of one or more monomers selected from the group consisting of $C_{4-6}$ conjugated diolefins.

The rubber may be prepared by a number of methods, preferably by emulsion or solution polymerization. These process are well known to those skilled in the art.

The vinyl aromatic polymers may be prepared by a number of methods. This process is well known to those skilled in the art and described for example in the above mentioned reference.

If present, preferably the rubber is present in an amount from about 3 to 10 weight %. Polybutadiene is a particularly useful rubber.

In the specific embodiment in which the vinyl aromatic polymer is polystyrene, it could be a crystal polystyrene or a rubber modified polystyrene. The rubber modified polystyrene is called HIPS (High Impact Polystyrene). The process for making HIPS is well known to those skilled in the art. The rubber is "dissolved" in the styrene monomer (actually the rubber is infinitely swollen with the monomer). This results in two co-continuous phases. The resulting "solution" is fed to a reactor and polymerized typically under shear. When the degree of polymerization is about equal to the weight % of rubber in the system it inverts (e.g. the styrene/styrene polymer phase becomes continuous and the rubber phase becomes discontinuous. After phase inversion the polymer is finished in a manner essentially similar to that for finishing polystyrene. The polymer is prepared using conventional bulk, solution, or suspension polymerization techniques.

The vinyl aromatic polymers of the present invention may be co- or homopolymers of $C_{8-12}$ vinyl aromatic monomers. Some vinyl aromatic monomers may be selected from the group consisting of styrene, alpha methyl styrene and para methyl styrene. Preferably the vinyl aromatic monomer is styrene. The vinyl aromatic polymer may be a copolymer comprising from 60 to 100 weight % of one or more $C_{8-12}$ vinyl aromatic monomers; and from 0 to 40 weight % of one or more monomers selected from the group consisting of $C_{1-4}$ alkyl esters of acrylic or methacrylic acid and acrylonitrile and methacrylonitrile. Suitable esters of acrylic and methacrylic acid include methyl acrylate, ethyl acyrlate, butyl acrylate, methyl methacrylate, ethyl methacrylate and butyl methacrylate. The vinyl aromatic polymers of the present invention may be rubber modified.

Such vinyl aromatic polymers are described in WO 01-68765, EP 1148086, U.S. Pat. No. 6,825,270, EP 770632, EP 1251143, EP 620236, US 2005-0070662, U.S. Pat. No. 6,569,941 and EP 664303.

As regards the residuals, the level is typically 100-1000 ppm and most frequently 200 to 500 ppm. In the specific embodiment in which the vinyl aromatic polymer is polystyrene the residuals are mainly styrene. Ethyl-benzene level can be 0 to 100 ppm.

As regards the solid in powder, the particle size is advantageously ranging from 5 nm to 200 µm. The solid in powder could have no porosity, should there is a porosity, advantageously the pores size is ranging from 1.8 nm to 20 nm (also called mesoporosity). Advantageously the solid specific surface is higher than 100 $m^2/g$ and preferably between 150 and 1000 $m^2/g$ and more preferably between 500 and 1000 $m^2/g$. It is recommended the specific surface to be as high as possible. Advantageously the chemical composition is silica-alumina. Preferably the solid in powder is selected from the group comprising amorphous silica alumina (ASA), crystalline silica alumina (CSA) and fumed silica alumina (FSA). It is recommended the microporosity to be as low as possible. This means the total volume of the micropores should be less than 5% of the total porosity. Total porosity means the volume of the mesopores and the volume of the micropores. Advantageously the atomic ratio Si/Al is ranging from 2.5 to 150 and preferably from 2.5 to 100. As regards ASA the preferred range Si/Al is from 6 to 40. Advantageously the acidity of said solid in powder is lower than 9 and preferably ranging from 3 to 6. Measurement of acidity is made on distilled water containing 2 weight % of the solid in powder. The solid in powder can have simultaneously 2 or more of the above features.

Proportion of the solid powder in the vinyl aromatic polymer is advantageously 0.01 to 5 weight %, preferably between 0.1 to 1 and more preferably between 0.2 to 0.6. The alkylation reaction is around 10 seconds to 10 minutes, the limiting factor is the quality of contact between the unpolymerized monomer, the solid in powder and the vinyl aromatic polymer.

The solid in powder can be injected upstream the last devolatilization section or more preferably downstream the last devolatilization section of the vinyl aromatic monomer polymerization facility. Devolatilization means the removal of the unpolymerized monomer in the course of the polymerization. A static mixer can be added to ensure a good mixing with the vinyl aromatic polymer. The solid in powder can be added by mixing it with oil, vinyl aromatic monomer or another organic liquid to obtain a mixture and then injecting said mixture with a pump or an extruder. The solid in powder can also be added to the vinyl aromatic polymer by way of a masterbatch in the vinyl aromatic polymer and further injecting said masterbatch with an extruder. The solid in powder can also be added as a suspension in water in the course of devolatilization in the stripping section of the vinyl aromatic monomer polymerization facility. This is of particular interest for the fumed silica alumina. The solid in powder can also be added to the vinyl aromatic polymer and the resulting blend is melted in an extruder or mixing apparatus usual in the thermoplastics industry. The solid in powder can also be added to the vinyl aromatic polymer while said vinyl aromatic polymer is in the molten state to be recovered as pellets or before injection in a mould, an extrusion apparatus or equivalent.

It is recommended to add said solid in powder, whichever the way it is injected in the vinyl aromatic polymer, before injecting the basic pH additives, if any, in said vinyl aromatic polymer.

EXAMPLES

Crystal polystyrene granulates and optionally a solid powder are extruded in the following conditions :

Clear polystyrene granulates (MI 2=30) are injected in a single screw extruder via a dosing-hopper at a mass flowrate of 2.5 kg/h optionally with a solid powder. The extrusion temperature profil is between 190 and 210° C. along the extruder. The PS mean residence time through the extruder is 12 min. Several samples of PS are taken at the outlet of the die.

Then Styrene, E-benzene residual contents in the samples are determined by the following method (volatils extraction by dissolution/precipitation)

Dissolution of 2 g of the sample in dichloromethane (20 cc) (stirring for 4 hours)

Precipitation of the PS by addition of 5 ml of methanol (stirring for 4 hours)

Determination of the styrene, ethyl-benzene (EB) concentration in the solution by gas phase chromatography.

The crystal polystyrene is a Total Petrochemicals commercial grade (PS 1960) having a Melt Index MI5 (5 kg-200° C.) equal to 30.

The Y zeolite (Abscent 1000 from UOP) has a ratio Si/Al=30, pH: 5.2 and an average pore size: 10 Angstrom (1 nm).

FSA is Aerosil® MOX 170 supplied by Degussa,

ASA is supplied by Grace under the trade mark Davicat®

The results are on table 1

TABLE 1

| Silica alumina | Si/Al | Pore size (Å) | Spec. area (m²/g) | pH | % Zeolite or ASA or CSA or FSA in PS | Styrene (ppm) | EB (ppm) | Total volatil | Color |
|---|---|---|---|---|---|---|---|---|---|
| no | — | — | — | — | 0 | 180 | 25 | 205 | |
| Zeolite Y | 30 | 10 | — | 5.2 | 0.25 | 13 | 112 | 125 | Dark Brown |
| CSA | 30 | 81 | 880 | 3.4 | 0.25 | 46 | 28 | 74 | No color (slightly hazy) |
| CSA | 100 | 36 | 990 | 3.2 | 0.25 | 77 | 38 | 115 | No color (slightly hazy) |
| ASA | 2.5 | 70 | 450 | 7.8 | 0.25 | 114 | 27 | 141 | No color (slightly hazy) |
| ASA | 6 | 130 | 360 | 5.8 | 0.25 | 135 | 26 | 161 | No color (slightly hazy) |
| ASA | 6 | 60 | 500 | 5 | 0.25 | 60 | 32 | 92 | No color (slightly hazy) |
| ASA | 7 | 46 | 640 | 4.7 | 0.25 | 85 | 40 | 125 | No color (slightly hazy) |
| ASA | 40 | 20 | 790 | 3.2 | 0.25 | 52 | 37 | 89 | No color (slightly hazy) |
| ASA | 45 | 135 | 315 | 3.3 | 0.25 | 113 | 25 | 138 | No color (slightly hazy) |
| ASA | 2.5 | 70 | 450 | 7.8 | 0.5 | 81 | 29 | 110 | No color (slightly hazy) |
| ASA | 6 | 60 | 500 | 5 | 0.5 | 40 | 36 | 76 | No color (slightly hazy) |
| ASA | 40 | 20 | 790 | 3.2 | 0.5 | 34 | 35 | 69 | No color (slightly hazy) |
| FSA | 100 | — | 170 | 4 | 0.5 | 120 | 25 | 145 | No color (slightly hazy) |

The invention claimed is:

1. A process for reducing residual vinyl aromatic monomer in a vinyl aromatic polymer comprising:
    contacting a molten vinyl aromatic polymer comprising residual vinyl aromatic monomer with a solid powder to catalyze alkylation of the residual vinyl aromatic monomer downstream of a devolitization section of a vinyl aromatic monomer polymerization facility.

2. The process of claim 1, wherein the vinyl aromatic polymer comprises:
    from 60 to 100 weight % of one or more $C_{8-12}$ vinyl aromatic monomers; and
    from 0 to 40 weight % of one or more monomers selected from the group consisting of $C_{1-4}$ alkyl esters of acrylic or methacrylc acid and acrylonitrile and methacrylonitrile, wherein the vinyl aromatic polymer may be grafted onto or occluded within from 0 to 20 weight % of one or more rubbery polymers.

3. The process of claim 1, wherein a particle size of the solid powder is from 5 nm to 200 μm.

4. The process of claim 1, wherein the solid powder has a specific area higher than 100 $m^2/g$.

5. The process of claim 1, wherein the solid powder is absent porosity.

6. The process of claim 1, wherein the solid powder exhibits a pore size of from 1.8 nm to 20 nm.

7. The process of claim 1, wherein the solid powder comprises silica-alumina.

8. The process of claim 7, wherein the solid powder is selected from amorphous silica alumina (ASA), crystalline silica alumina (CSA) and fumed silica alumina (FSA).

9. The process of claim 7, wherein the solid powder exhibits an atomic ratio of Si/Al of from 2.5 to 150.

10. The process of claim 1, wherein the solid powder exhibits an acidity of less than 9.

11. The process of claim 1, wherein the solid powder exhibits an acidity of from 3 to 6.

* * * * *